United States Patent
Chen et al.

(10) Patent No.: US 12,175,637 B2
(45) Date of Patent: *Dec. 24, 2024

(54) IMAGES FOR PERCEPTION MODULES OF AUTONOMOUS VEHICLES

(71) Applicants: TUSIMPLE, INC., San Diego, CA (US); BEIJING TUSEN WEILAI TECHNOLOGY CO., LTD., Beijing (CN)

(72) Inventors: Pengfei Chen, San Diego, CA (US); Nan Yu, San Diego, CA (US); Naiyan Wang, Beijing (CN); Xiaodi Hou, San Diego, CA (US)

(73) Assignees: TUSIMPLE, INC., San Diego, CA (US); BEIJING TUSEN WEILAI TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,577

(22) Filed: Jun. 29, 2023

(65) Prior Publication Data
US 2023/0351556 A1 Nov. 2, 2023

Related U.S. Application Data

(63) Continuation of application No. 17/308,911, filed on May 5, 2021, now Pat. No. 11,694,308, which is a
(Continued)

(51) Int. Cl.
*G06T 5/70* (2024.01)
*B60W 40/02* (2006.01)
(Continued)

(52) U.S. Cl.
CPC .............. *G06T 5/70* (2024.01); *B60W 40/02* (2013.01); *G06T 5/75* (2024.01); *G06T 5/92* (2024.01);
(Continued)

(58) Field of Classification Search
CPC ... B60W 2420/42; B60W 40/02; G01S 17/89; G06K 9/00791; G06K 9/00805;
(Continued)

(56) References Cited

U.S. PATENT DOCUMENTS 6,084,870 A 7/2000 Wooten et al.
6,263,088 B1 7/2001 Crabtree
(Continued)

FOREIGN PATENT DOCUMENTS

CN 101068311 A 11/2007
CN 101288296 A 10/2008
(Continued)

OTHER PUBLICATIONS

Albert S. Huang, "Finding multiple lanes in urban road networks with vision and lidar, "Mar. 24, 2009,Autonomous Robots vol. 26, pp. 104-112.*
(Continued)

*Primary Examiner* — Omar S Ismail
(74) *Attorney, Agent, or Firm* — Perkins Coie LLP

(57) ABSTRACT

Disclosed are devices, systems and methods for processing an image. In one aspect a method includes receiving an image from a sensor array including an x-y array of pixels, each pixel in the x-y array of pixels having a value selected from one of three primary colors, based on a corresponding x-y value in a mask pattern. The method may further include generating a preprocessed image by performing preprocessing on the image. The method may further include performing perception on the preprocessed image to determine one or more outlines of physical objects.

20 Claims, 6 Drawing Sheets

Related U.S. Application Data continuation of application No. 16/381,707, filed on Apr. 11, 2019, now Pat. No. 11,010,874.

(60) Provisional application No. 62/656,924, filed on Apr. 12, 2018.

(51) Int. Cl.
*G06T 5/75* (2024.01)
*G06T 5/92* (2024.01)
*H04N 25/13* (2023.01)

(52) U.S. Cl.
CPC ....... *H04N 25/13* (2023.01); *B60W 2420/403* (2013.01); *G06T 2207/10024* (2013.01)

(58) Field of Classification Search
CPC .......... G06T 2207/10024; G06T 5/002; G06T 5/004; G06T 5/009; H04N 5/3456; H04N 9/04511; H04N 9/04551; H04N 9/04557
See application file for complete search history.

(56) References Cited

U.S. PATENT DOCUMENTS

| | | |
|---|---|---|
| 6,594,821 B1 | 7/2003 | Banning et al. |
| 6,777,904 B1 | 8/2004 | Degner |
| 6,975,923 B2 | 12/2005 | Spriggs |
| 7,103,460 B1 | 9/2006 | Breed |
| 7,689,559 B2 | 3/2010 | Canright |
| 7,742,841 B2 | 6/2010 | Sakai et al. |
| 7,783,403 B2 | 8/2010 | Breed |
| 7,844,595 B2 | 11/2010 | Canright |
| 8,041,111 B1 * | 10/2011 | Wilensky ................ H04N 1/62 345/589 |
| 8,064,643 B2 | 11/2011 | Stein |
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,346,480 B2 | 1/2013 | Trepagnier et al. |
| 8,378,851 B2 | 2/2013 | Stein |
| 8,392,117 B2 | 3/2013 | Dolgov |
| 8,401,292 B2 | 3/2013 | Park |
| 8,412,449 B2 | 4/2013 | Trepagnier |
| 8,478,072 B2 | 7/2013 | Aisaka |
| 8,553,088 B2 | 10/2013 | Stein |
| 8,706,394 B2 | 4/2014 | Trepagnier et al. |
| 8,718,861 B1 | 5/2014 | Montemerlo et al. |
| 8,788,134 B1 | 7/2014 | Litkouhi |
| 8,908,041 B2 | 12/2014 | Stein |
| 8,917,169 B2 | 12/2014 | Schofield |
| 8,963,913 B2 | 2/2015 | Baek |
| 8,965,621 B1 | 2/2015 | Urmson |
| 8,981,966 B2 | 3/2015 | Stein |
| 8,983,708 B2 | 3/2015 | Choe et al. |
| 8,993,951 B2 | 3/2015 | Schofield |
| 9,002,632 B1 | 4/2015 | Emigh |
| 9,008,369 B2 | 4/2015 | Schofield |
| 9,025,880 B2 * | 5/2015 | Perazzi ................ G06V 10/758 382/190 |
| 9,042,648 B2 * | 5/2015 | Wang ...................... G06T 7/143 382/199 |
| 9,081,385 B1 | 7/2015 | Ferguson et al. |
| 9,088,744 B2 | 7/2015 | Grauer et al. |
| 9,111,444 B2 * | 8/2015 | Kaganovich ......... G06V 10/255 |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 * | 9/2015 | Zhang .................... G06T 7/162 |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,214,084 B2 | 12/2015 | Grauer et al. |
| 9,219,873 B2 | 12/2015 | Grauer et al. |
| 9,233,659 B2 | 1/2016 | Rosenbaum |
| 9,233,688 B2 | 1/2016 | Clarke |
| 9,248,832 B2 | 2/2016 | Huberman |
| 9,248,835 B2 | 2/2016 | Tanzmeister |
| 9,251,708 B2 | 2/2016 | Rosenbaum |
| 9,277,132 B2 | 3/2016 | Berberian |
| 9,280,711 B2 | 3/2016 | Stein |
| 9,282,144 B2 | 3/2016 | Tebay et al. |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,033 B2 | 4/2016 | Ibanez-guzman et al. |
| 9,317,776 B1 | 4/2016 | Honda |
| 9,330,334 B2 | 5/2016 | Lin |
| 9,342,074 B2 | 5/2016 | Dolgov |
| 9,347,779 B1 | 5/2016 | Lynch |
| 9,355,635 B2 | 5/2016 | Gao |
| 9,365,214 B2 | 6/2016 | Ben Shalom |
| 9,399,397 B2 | 7/2016 | Mizutani |
| 9,418,549 B2 | 8/2016 | Kang et al. |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,483,839 B1 | 11/2016 | Kwon |
| 9,490,064 B2 | 11/2016 | Hirosawa |
| 9,494,935 B2 | 11/2016 | Okumura et al. |
| 9,507,346 B1 | 11/2016 | Levinson et al. |
| 9,513,634 B2 | 12/2016 | Pack et al. |
| 9,531,966 B2 | 12/2016 | Stein |
| 9,535,423 B1 | 1/2017 | Debreczeni |
| 9,538,113 B2 | 1/2017 | Grauer et al. |
| 9,547,985 B2 | 1/2017 | Tuukkanen |
| 9,549,158 B2 | 1/2017 | Grauer et al. |
| 9,555,803 B2 | 1/2017 | Pawlicki |
| 9,568,915 B1 | 2/2017 | Berntorp |
| 9,587,952 B1 | 3/2017 | Slusar |
| 9,599,712 B2 | 3/2017 | Van Der Tempel et al. |
| 9,600,889 B2 | 3/2017 | Boisson et al. |
| 9,602,807 B2 | 3/2017 | Crane et al. |
| 9,612,123 B1 | 4/2017 | Levinson et al. |
| 9,620,010 B2 | 4/2017 | Grauer et al. |
| 9,625,569 B2 | 4/2017 | Lange |
| 9,628,565 B2 | 4/2017 | Stenneth et al. |
| 9,649,999 B1 | 5/2017 | Amireddy et al. |
| 9,652,860 B1 | 5/2017 | Maali |
| 9,669,827 B1 | 6/2017 | Ferguson et al. |
| 9,672,446 B1 | 6/2017 | Vallespi-Gonzalez |
| 9,679,206 B1 | 6/2017 | Ferguson |
| 9,690,290 B2 | 6/2017 | Prokhorov |
| 9,701,023 B2 | 7/2017 | Zhang et al. |
| 9,712,754 B2 | 7/2017 | Grauer et al. |
| 9,720,418 B2 | 8/2017 | Stenneth |
| 9,723,097 B2 | 8/2017 | Harris |
| 9,723,099 B2 | 8/2017 | Chen |
| 9,723,233 B2 | 8/2017 | Grauer et al. |
| 9,726,754 B2 | 8/2017 | Massanell et al. |
| 9,729,860 B2 | 8/2017 | Cohen et al. |
| 9,738,280 B2 | 8/2017 | Rayes |
| 9,739,609 B1 | 8/2017 | Lewis |
| 9,746,550 B2 | 8/2017 | Nath |
| 9,753,128 B2 | 9/2017 | Schweizer et al. |
| 9,753,141 B2 * | 9/2017 | Grauer .................... G01S 17/18 |
| 9,754,490 B2 | 9/2017 | Kentley et al. |
| 9,760,837 B1 | 9/2017 | Nowozin et al. |
| 9,766,625 B2 | 9/2017 | Boroditsky et al. |
| 9,769,456 B2 | 9/2017 | You et al. |
| 9,773,155 B2 | 9/2017 | Shotton et al. |

(56) References Cited

U.S. PATENT DOCUMENTS

| | | | |
|---|---|---|---|
| 9,779,276 B2 | 10/2017 | Todeschini et al. | |
| 9,785,149 B2 | 10/2017 | Wang et al. | |
| 9,805,294 B2 | 10/2017 | Liu et al. | |
| 9,810,785 B2 | 11/2017 | Grauer et al. | |
| 9,823,339 B2 | 11/2017 | Cohen | |
| 9,911,030 B1 | 3/2018 | Zhu | |
| 9,953,236 B1 | 4/2018 | Huang | |
| 10,147,193 B2 | 12/2018 | Huang | |
| 10,223,806 B1 | 3/2019 | Yi et al. | |
| 10,223,807 B1 | 3/2019 | Yi et al. | |
| 10,410,055 B2 | 9/2019 | Wang et al. | |
| 11,010,874 B2 | 5/2021 | Chen et al. | |
| 2003/0114980 A1 | 6/2003 | Klausner et al. | |
| 2003/0174773 A1 | 9/2003 | Comaniciu | |
| 2004/0264763 A1 | 12/2004 | Mas et al. | |
| 2007/0183661 A1 | 8/2007 | El-Maleh | |
| 2007/0183662 A1 | 8/2007 | Wang | |
| 2007/0230792 A1 | 10/2007 | Shashua | |
| 2007/0286526 A1 | 12/2007 | Abousleman | |
| 2008/0249667 A1 | 10/2008 | Horvitz | |
| 2009/0040054 A1 | 2/2009 | Wang | |
| 2009/0087029 A1 | 4/2009 | Coleman | |
| 2010/0049397 A1 | 2/2010 | Liu | |
| 2010/0111417 A1 | 5/2010 | Ward | |
| 2010/0195908 A1* | 8/2010 | Bechtel | H04N 5/213 382/167 |
| 2010/0226564 A1 | 9/2010 | Marchesotti | |
| 2010/0281361 A1 | 11/2010 | Marchesotti | |
| 2010/0303349 A1* | 12/2010 | Bechtel | H04N 25/134 382/165 |
| 2011/0142283 A1 | 6/2011 | Huang | |
| 2011/0206282 A1 | 8/2011 | Aisaka | |
| 2011/0247031 A1 | 10/2011 | Jacoby | |
| 2012/0041636 A1 | 2/2012 | Johnson et al. | |
| 2012/0105639 A1 | 5/2012 | Stein | |
| 2012/0140076 A1 | 6/2012 | Rosenbaum | |
| 2012/0274629 A1 | 11/2012 | Baek | |
| 2012/0314070 A1 | 12/2012 | Zhang et al. | |
| 2013/0051613 A1 | 2/2013 | Bobbitt et al. | |
| 2013/0083959 A1 | 4/2013 | Owechko | |
| 2013/0182134 A1 | 7/2013 | Grundmann et al. | |
| 2013/0204465 A1 | 8/2013 | Phillips et al. | |
| 2013/0266187 A1 | 10/2013 | Bulan | |
| 2013/0329052 A1 | 12/2013 | Chew | |
| 2013/0342674 A1 | 12/2013 | Dixon | |
| 2014/0072170 A1 | 3/2014 | Zhang | |
| 2014/0104051 A1 | 4/2014 | Breed | |
| 2014/0142799 A1 | 5/2014 | Ferguson et al. | |
| 2014/0143839 A1 | 5/2014 | Ricci | |
| 2014/0145516 A1 | 5/2014 | Hirosawa | |
| 2014/0168421 A1 | 6/2014 | Xu | |
| 2014/0198184 A1 | 7/2014 | Stein | |
| 2014/0321704 A1 | 10/2014 | Partis | |
| 2014/0334668 A1 | 11/2014 | Saund | |
| 2014/0340570 A1* | 11/2014 | Meyers | G06T 5/50 348/370 |
| 2015/0062304 A1 | 3/2015 | Stein | |
| 2015/0269438 A1 | 9/2015 | Samarasekera et al. | |
| 2015/0294160 A1* | 10/2015 | Takahashi | G06T 11/206 382/104 |
| 2015/0310370 A1 | 10/2015 | Burry | |
| 2015/0312537 A1* | 10/2015 | Solhusvik | H04N 25/133 348/302 |
| 2015/0353082 A1 | 12/2015 | Lee et al. | |
| 2016/0008988 A1 | 1/2016 | Kennedy | |
| 2016/0026787 A1 | 1/2016 | Nairn et al. | |
| 2016/0037064 A1 | 2/2016 | Stein | |
| 2016/0094774 A1 | 3/2016 | Li | |
| 2016/0118080 A1 | 4/2016 | Chen | |
| 2016/0129907 A1 | 5/2016 | Kim | |
| 2016/0165157 A1 | 6/2016 | Stein | |
| 2016/0210528 A1 | 7/2016 | Duan | |
| 2016/0224850 A1 | 8/2016 | Silver | |
| 2016/0275766 A1 | 9/2016 | Venetianer et al. | |
| 2016/0321381 A1 | 11/2016 | English | |
| 2016/0334230 A1 | 11/2016 | Ross et al. | |
| 2016/0342837 A1 | 11/2016 | Hong et al. | |
| 2016/0347322 A1 | 12/2016 | Clarke et al. | |
| 2016/0375907 A1 | 12/2016 | Erban | |
| 2017/0048500 A1* | 2/2017 | Shi | H04N 9/646 |
| 2017/0053169 A1 | 2/2017 | Cuban et al. | |
| 2017/0061632 A1* | 3/2017 | Lindner | G01S 17/86 |
| 2017/0098132 A1* | 4/2017 | Yokota | G06T 7/194 |
| 2017/0113613 A1* | 4/2017 | Van Dan Elzen | H04N 23/57 |
| 2017/0124476 A1 | 5/2017 | Levinson et al. | |
| 2017/0134631 A1 | 5/2017 | Zhao et al. | |
| 2017/0160197 A1* | 6/2017 | Ozcan | G06V 20/693 |
| 2017/0177951 A1 | 6/2017 | Yang et al. | |
| 2017/0301104 A1* | 10/2017 | Qian | G06F 16/583 |
| 2017/0305423 A1 | 10/2017 | Green | |
| 2017/0318407 A1 | 11/2017 | Meister | |
| 2018/0151063 A1 | 5/2018 | Pun | |
| 2018/0158197 A1 | 6/2018 | Dasgupta | |
| 2018/0210465 A1* | 7/2018 | Qu | G06T 7/593 |
| 2018/0260956 A1 | 9/2018 | Huang | |
| 2018/0283892 A1 | 10/2018 | Behrendt | |
| 2018/0373980 A1* | 12/2018 | Huval | G06F 18/41 |
| 2019/0025853 A1 | 1/2019 | Julian | |
| 2019/0065863 A1* | 2/2019 | Luo | G06F 18/2415 |
| 2019/0066329 A1 | 2/2019 | Luo et al. | |
| 2019/0066330 A1 | 2/2019 | Luo et al. | |
| 2019/0066344 A1* | 2/2019 | Luo | G01C 21/26 |
| 2019/0108384 A1 | 4/2019 | Wang et al. | |
| 2019/0120955 A1* | 4/2019 | Zhong | G01S 13/931 |
| 2019/0132391 A1 | 5/2019 | Thomas | |
| 2019/0132392 A1 | 5/2019 | Liu | |
| 2019/0132572 A1* | 5/2019 | Shen | G01S 7/4811 |
| 2019/0210564 A1 | 7/2019 | Han | |
| 2019/0210613 A1 | 7/2019 | Sun | |
| 2019/0236950 A1 | 8/2019 | Li | |
| 2019/0257987 A1* | 8/2019 | Saari | H04N 13/207 |
| 2019/0266420 A1 | 8/2019 | Ge | |
| 2019/0318456 A1* | 10/2019 | Chen | G06T 5/75 |
| 2021/0256664 A1 | 8/2021 | Chen et al. | |

FOREIGN PATENT DOCUMENTS

| | | |
|---|---|---|
| CN | 101610419 A | 12/2009 |
| CN | 102835115 A | 12/2012 |
| CN | 105698812 A | 6/2016 |
| CN | 106340197 A | 1/2017 |
| CN | 106488091 A | 3/2017 |
| CN | 106781591 A | 5/2017 |
| CN | 108010360 A | 5/2018 |
| DE | 2608513 A1 | 9/1977 |
| EP | 890470 B1 | 1/1999 |
| EP | 1754179 A1 | 2/2007 |
| EP | 2448251 A2 | 5/2012 |
| EP | 2463843 A2 | 6/2012 |
| EP | 2761249 A1 | 8/2014 |
| EP | 2946336 A2 | 11/2015 |
| EP | 2993654 A1 | 3/2016 |
| EP | 3081419 A1 | 10/2016 |
| JP | 2018129753 A | 8/2018 |
| KR | 100802511 A1 | 2/2008 |
| WO | 1991009375 A1 | 6/1991 |
| WO | 2005098739 A1 | 10/2005 |
| WO | 2005098751 A1 | 10/2005 |
| WO | 2005098782 A1 | 10/2005 |
| WO | 2010109419 A | 9/2010 |
| WO | 2013045612 A1 | 4/2013 |
| WO | 2014111814 A2 | 7/2014 |
| WO | 2014166245 A1 | 10/2014 |
| WO | 2014201324 A1 | 12/2014 |
| WO | 2015083009 A1 | 6/2015 |
| WO | 2015103159 A1 | 7/2015 |
| WO | 2015125022 A2 | 8/2015 |
| WO | 2015186002 A2 | 12/2015 |
| WO | 2016090282 A1 | 6/2016 |
| WO | 2016135736 A2 | 9/2016 |
| WO | 2017079349 A1 | 5/2017 |
| WO | 2017079460 A2 | 5/2017 |
| WO | 2017013875 A1 | 5/2018 |

(56) References Cited

FOREIGN PATENT DOCUMENTS

| | | |
|---|---|---|
| WO | 2019040800 A1 | 2/2019 |
| WO | 2019084491 A1 | 5/2019 |
| WO | 2019084494 A1 | 5/2019 |
| WO | 2019140277 A2 | 7/2019 |
| WO | 2019168986 A1 | 9/2019 |

OTHER PUBLICATIONS

Alberto Faro, "Evaluation of the Traffic Parameters in a Metropolitan Area by Fusing Visual Perceptions and CNN Processing of Webcam Images," May 20, 2008, IEEE Transactions on Neural Networks, vol. 19, No. 6, Jun. 2008, pp. 1108-1122.*

Narayan Bhosale, "Analysis of Effect of Gaussian, Salt and Pepper Noise Removal from Noisy Remote Sensing Images," Proceedings of the Second International Conference on "Emerging Research in Computing, Information, Coomuncation and Applications" ERCICA 2014, pp. 384-389.*

Dammer, Karin, et al., "Demosaising using a Convolutional Neural Network approach." Jun. 16, 2017, Master's Theses in Mathematical Sciences (2017), pp. 7-24.*

Chinese Patent Office, Decision of Rejection for CN 201910192585.4, Mailing Date: Mar. 3, 2022, 17 pages with English translation.

Chinese Patent Office, Second Office Action for CN 201910192584.X, Mailing Date: Jan. 24, 2022, 9 pages with English translation.

Chinese Patent Office, Third Office Action for CN 201910192584.X, Mailing Date: Dec. 8, 2022, 4 pages without English translation.

Carle, Patrick J.F. et al. "Global Rover Localization by Matching Lidar and Orbital 3D Maps." IEEE, Anchorage Convention District, pp. 1-6, May 3-8, 2010. (Anchorage Alaska, US).

Caselitz, T. et al., "Monocular camera localization in 3D LiDAR maps," European Conference on Computer Vision (2014) Computer Vision—ECCV 2014. ECCV 2014. Lecture Notes in Computer Science, vol. 8690. Springer, Cham.

Mur-Artal, R. et al., "ORB-SLAM: A Versatile and Accurate Monocular SLAM System," IEEE Transaction on Robotics, Oct. 2015, pp. 1147-1163, vol. 31, No. 5, Spain.

Sattler, T. et al., "Are Large-Scale 3D Models Really Necessary for Accurate Visual Localization?" CVPR, IEEE, 2017, pp. 1-10.

Engel, J. et la. "LSD-SLAM: Large Scare Direct Monocular SLAM," pp. 1-16, Munich.

Levinson, Jesse et al., Experimental Robotics, Unsupervised Calibration for Multi-Beam Lasers, pp. 179-194, 12th Ed., Oussama Khatib, Vijay Kumar, Gaurav Sukhatme (Eds.) Springer-Verlag Berlin Heidelberg 2014.

Geiger, Andreas et al., "Automatic Camera and Range Sensor Calibration using a single Shot", Robotics and Automation (ICRA), pp. 1-8, 2012 IEEE International Conference.

Zhang, Z. et al. A Flexible new technique for camera calibration. IEEE Transactions on Pattern Analysis and Machine Intelligence (vol. 22, Issue: 11, Nov. 2000).

Bar-Hillel, Aharon et al. "Recent progress in road and lane detection: a survey." Machine Vision and Applications 25 (2011): 727-745.

Schindler, Andreas et al. "Generation of high precision digital maps using circular arc splines," 2012 IEEE Intelligent Vehicles Symposium, Alcala de Henares, 2012, pp. 246-251. doi: 10.1109/IVS.2012.6232124.

Hou, Xiaodi and Zhang, Liqing, "Saliency Detection: A Spectral Residual Approach", Computer Vision and Pattern Recognition, CVPR'07—IEEE Conference, pp. 1-8, 2007.

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.

Li, Yanghao and Wang, Naiyan and Liu, Jiaying and Hou, Xiaodi, "Demystifying Neural Style Transfer", arXiv preprint arXiv:1701.01036, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.

Li, Yanghao and Wang, Naiyan and Liu, Jiaying and Hou, Xiaodi, "Factorized Bilinear Models for Image Recognition", arXiv preprint arXiv:1611.05709, 2016.

Hou, Xiaodi, "Computational Modeling and Psychophysics in Low and Mid-Level Vision", California Institute of Technology, 2014.

Spinello, Luciano, Triebel, Rudolph, Siegwart, Roland, "Multiclass Multimodal Detection and Tracking in Urban Environments", Sage Journals, vol. 29 Issue 12, pp. 1498-1515 Article first published online: Oct. 7, 2010; Issue published: Oct. 1, 2010.

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, date unknown.

Kyoungho Ahn, Hesham Rakha, "The Effects of Route Choice Decisions on Vehicle Energy Consumption and Emissions", Virginia Tech Transportation Institute, Blacksburg, VA 24061, date unknown.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.

Schroff, Florian, Dmitry Kalenichenko, James Philbin, (Google), "FaceNet: A Unified Embedding for Face Recognition and Clustering", CVPR 2015.

Dai, Jifeng, Kaiming He, Jian Sun, (Microsoft Research), "Instance-aware Semantic Segmentation via Multi-task Network Cascades", CVPR 2016.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.

Tian Li, "Proposal Free Instance Segmentation Based on Instance-aware Metric", Department of Computer Science, Cranberry-Lemon University, Pittsburgh, PA., date unknown.

Mohammad Norouzi, David J. Fleet, Ruslan Salakhutdinov, "Hamming Distance Metric Learning", Departments of Computer Science and Statistics, University of Toronto, date unknown.

(56) References Cited

OTHER PUBLICATIONS

Jain, Suyong Dutt, Grauman, Kristen, "Active Image Segmentation Propagation", In Proceedings of the IEEE Conference on Computer Vision and Pattern Recognition (CVPR), Las Vegas, Jun. 2016.
MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), 2014.
Kendall, Alex, Gal, Yarin, "What Uncertainties Do We Need in Bayesian Deep Learning for Computer Vision", arXiv:1703.04977v1 [cs.CV] Mar. 15, 2017.
Wei, Junqing, John M. Dolan, Bakhtiar Litkhouhi, "A Prediction- and Cost Function-Based Algorithm for Robust Autonomous Freeway Driving", 2010 IEEE Intelligent Vehicles Symposium, University of California, San Diego, CA, USA, Jun. 21-24, 2010.
Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, 2010.
Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV] Nov. 29, 2016.
P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.
C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.
Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, 2016.
Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, Mar. 2007.
Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, 2016.
Adhiraj Somani, Nan Ye, David Hsu, and Wee Sun Lee, "DESPOT: Online POMDP Planning with Regularization", Department of Computer Science, National University of Singapore, date unknown.
Adam Paszke, Abhishek Chaurasia, Sangpil Kim, and Eugenio Culurciello. Enet: A deep neural network architecture for real-time semantic segmentation. CoRR, abs/1606.02147, 2016.
Szeliski, Richard, "Computer Vision: Algorithms and Applications" http://szeliski.org/Book/, 2010.
Chinese Application No. 201910192585.4, First Office Action Mailed Feb. 3, 2021.
Queau, Yvain et al., Microgeometry capture and RGB albedo estimation by photometric stereo without demosaicing. Open Archive Toulouse Archive Ouverte, May 14, 2017, pp. 1-7.
Losson, Olivier & Porebski, A. & Vandenbroucke, Nicolas & Macaire, Ludovic. (2013). Color texture analysis using CFA chromatic co-occurrence matrices. Computer Vision and Image Understanding. 117. 747-763. 10.1016/j.cviu.2013.03.001.
Chinese Application No. 201910192584.X, First Office Action Mailed Feb. 3, 2021.
Diamond, Steven et al. Dirty pixels: Optimizing Image Classification architectures for raw sensor data. Arxiv.org/abs/1701.06487 (Jan. 23, 2017). pp. 1-11.
Li, Zhenghao. PIMR: Parallel and Integrated Matching for Raw Data. Sensors (Basel). Jan. 2, 2016;16(1):54.

* cited by examiner

500

IMAGES FOR PERCEPTION MODULES OF AUTONOMOUS VEHICLES

CROSS-REFERENCE TO RELATED APPLICATIONS

This patent document is a continuation of U.S. patent application Ser. No. 17/308,911, filed on May 5, 2021, which is a continuation of U.S. application Ser. No. 16/381,707, filed on Apr. 11, 2019, which claims priority to, and the benefit of U.S. Provisional Patent Application No. 62/656,924, filed on Apr. 12, 2018. The entire contents of the above patent applications are incorporated by reference as part of the disclosure of this patent document.

TECHNICAL FIELD

This document relates to reducing the data complexity for analysis and bandwidth required of autonomous vehicle images.

BACKGROUND

Autonomous vehicle navigation is a technology for sensing the position and movement of a vehicle, and based on the sensing, autonomously controlling the vehicle to navigate towards a destination. Autonomous vehicle navigation can have important applications in transportation of people, goods and services. One of the components of autonomous driving, which ensures the safety of the vehicle and its passengers, as well as people and property in the vicinity of the vehicle, is analysis of images taken from vehicle cameras. The images may be used to determine fixed or moving obstacles in the path of autonomous vehicle.

SUMMARY

Disclosed are devices, systems and methods for processing images of an area surrounding a vehicle. In some embodiments, light detection and ranging (LiDAR) sensors may be used to acquire the images based on reflections captured from the surrounding area. In one aspect, a method for processing an image taken from an autonomous vehicle is disclosed. The method includes receiving a raw image from a camera, the image including three values for each of three primary colors, and/or selecting one of the three values for each pixel in the image and discarding the other two values, wherein the selecting is performed in a pattern. The method may further include performing preprocessing on the reduced image, and/or performing perception on the preprocessed image to determine one or more outlines of physical objects in a vicinity of the autonomous vehicle.

The method may further include the following features in any combination. The selecting may reduce a data size of the raw image by a factor of ⅔. The pattern may be a Bayer pattern. The Bayer pattern may be a red-green-green-blue pattern assigned to a 2-pixel by 2-pixel array repeated across the raw image. The pattern may include a greater number of green pixel values than both red and blue. The pattern may be selected such that a value of every other pixel along a row in the reduced image corresponds to green value of the raw image. The pattern may be selected such that a value of every other pixel along a column in the reduced image corresponds to green value of the raw image. The generating the reduced image may be performed using one or more color-selective filters. Each x-y value in the pattern may be from one of three possible values. The preprocessing may be performed on the image from the sensor array without human perception image enhancement. The human perception image enhancement may include one or more of de-mosaicing, white balancing, and noise reduction. The preprocessing may not include scaling one or more pixels' R, G, or B value for white balancing. The preprocessing may not include reconstruction a full color image from incomplete color samples output from the sensor array overlaid with a color filter array for de-mosaicing. The preprocessing may not include noise reduction, wherein noise reduction includes reduction of salt and pepper noise, wherein a noisy pixel bears little relation to the color of surrounding pixels, or reduction of Gaussian noise. The preprocessing may include image cropping. The preprocessing may include image resizing. The preprocessing may include image compression. The sensor array may be a camera.

In another aspect, the above-described method is embodied in the form of executable code stored in a computer-readable program medium.

In yet another aspect, a device that is configured or operable to perform the above-described method is disclosed. The device may include a processor that is programmed to implement this method.

The above and other aspects and features of the disclosed technology are described in greater detail in the drawings, the description and the claims.

DETAILED DESCRIPTION

Pictures taken by still or video cameras are typically intended for human viewing. The pictures are in full color with high resolution in three primary color such as red (R), green (G) and blue (B). Image processing including vision tasks such as object detection, semantic segmentation, and others typically use processed, well rendered images that are intended for human eyes. However, images for use by machines do not need to have the same characteristics as images intended for human viewing. For example, de-mosaicing, white balancing, color reduction, and other image processing may not be necessary for machine vision used for autonomous vehicles. Since the foregoing image processing tasks do not add additional information, they may not be needed or be useful for machine images. Not performing some processing tasks such as white balancing, which can cause over exposure, also improves the images. Moreover, the amount of data required to represent an image for machine use is less than the full color RGB representation of an image.

In some example embodiments, the RGB information for each pixel in an image may be reduced so that instead of each pixel having intensity values for each of R, G, and B, each pixel has only one intensity corresponding to R, G or B. A predetermined pattern of R, G, and B may be assigned to the array of pixels in an image. By reducing the number of intensity values per pixel from three to one, the data required to represent the image is reduced to ⅓ of the data needed for a full color RGB image. In this way, the amount of data needed to represent an image is reduced to ⅓ while maintaining color sensitivity needed for colored objects in the image. Reducing the amount of data needed to represent the image reduces the bandwidth needed to transfer the image in a fixed amount of time or allows the image to be transferred or processed in less time. Both of these improve machine vision performance and responsiveness. As an illustrative example, a camera image with a size of 200 pixels by 300 pixels has 60,000 pixels. If each pixel is represented by an 8-bit red (R) value, an 8-bit green (G) value, and an 8-bit blue (B) value, the total number of bits required to represent the color image is 300 (pixels)×200 (pixels)×8 (bits)×3 (colors)=1,440,000 bits. By applying the pattern to select one of R, G, or B, for each pixel in a pattern, the number of bits needed to represent the image is reduced to 480,000. The foregoing is an example for illustrative purposes. Other numbers of pixels per image or bits of resolution per color can also be used.

Figure 1:
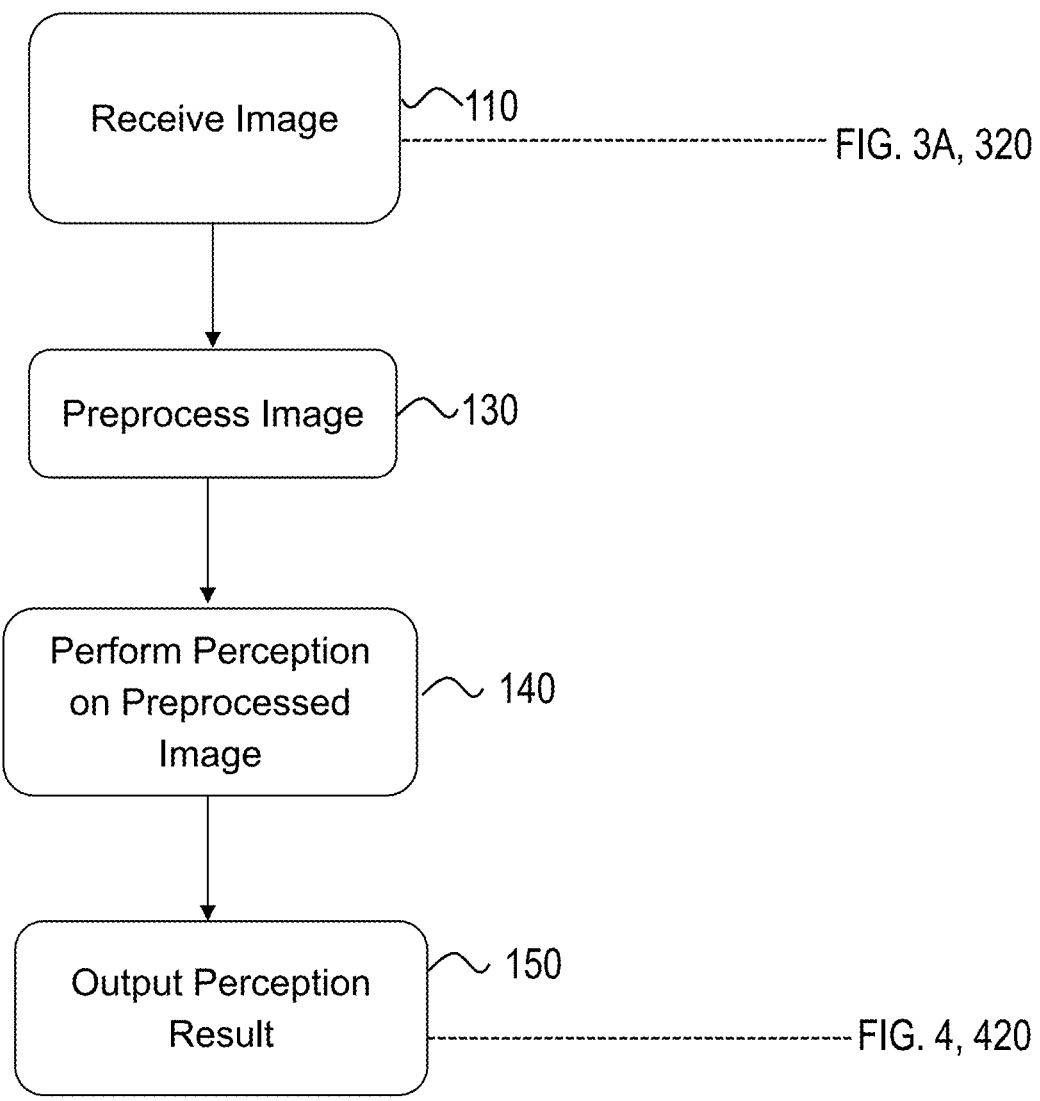
FIG. 1 depicts a flowchart for processing an image for use by an autonomous vehicle, in accordance with some example embodiments.

FIG. 1 depicts a flowchart 100 for processing an image for use by an autonomous vehicle, in accordance with some example embodiments. At 110, an image is received. At 120, the data required to represent the raw image is reduced. At 130, the reduced image is preprocessed. At 140, perception is performed on the preprocessed image. At 150, the perception result is provided as an output.

At 110, an image is received form a camera or LiDAR or other image generating device. For example, an image from a solid-state camera such as a charge coupled device (CCD) camera is received. The camera may have separate outputs for R, G, and B or may have a composite output. As an example, R, G, and B may each be represented by 8-bit luminance values or may be represented by analog voltages. In another example, the image may be from a multi-spectral Light Detection and ranging (LiDAR) sensor. Each "color" may be represented by an 8-bit or another bit resolution value.

At 120, the data required to represent the raw image is reduced. For example, the RGB information for each pixel in an image may be reduced so that instead of each pixel having intensity values for each of R, G, and B, each pixel has only one intensity corresponding to R, G or B. By reducing the number of intensity values from three to one, the data required to represent the image is reduced to ⅓ of the data needed for a full color RGB image. In this way, the amount of data needed to represent an image is reduced to ⅓ while maintaining color sensitivity needed for colored objects in the image. Pixels may be selected to be R, G, or B based on a pattern such as a Bayer pattern which is further detailed with respect to FIG. 3.

At 130, the reduced image is preprocessed. The preprocessing is minimized to increase processing speed and reduce computational complexity. For example, demosaicing and white balancing may be eliminated and basic pre-processing such as image cropping and resizing may be maintained.

At 140, perception is performed on the preprocessed image. Perception results include object bounding boxes. See, for example, FIG. 4 at 420. The performed perception is modified since the input images are not three channels for RGB, but are instead reduced to one channel of R, G, or B for each pixel. The perception is computerized and may occur at real time speeds in a moving vehicle without human assistance or feedback.

At 150, the perception result is provided as an output. The output may be used by further image processing tasks related to identifying objects and controlling the vehicle to avoid the objects.

Advantages of the disclosed techniques include the generation of a one-channel image compared to the three-channels (RGB) for usual images. This reduces the space required for storage by ⅔, and reduces the data rate or time for transmission, or a combination of data rate and time for transmission. The second advantage is reduced computational requirements because the image has less data to process and many preprocessing steps are eliminated. Another advantage is that the reduced image causes performance improvement because the raw data even though reduced has more information due to the reduced preprocessing (e.g., removed white balancing which may cause over-exposure).

Figure 2:
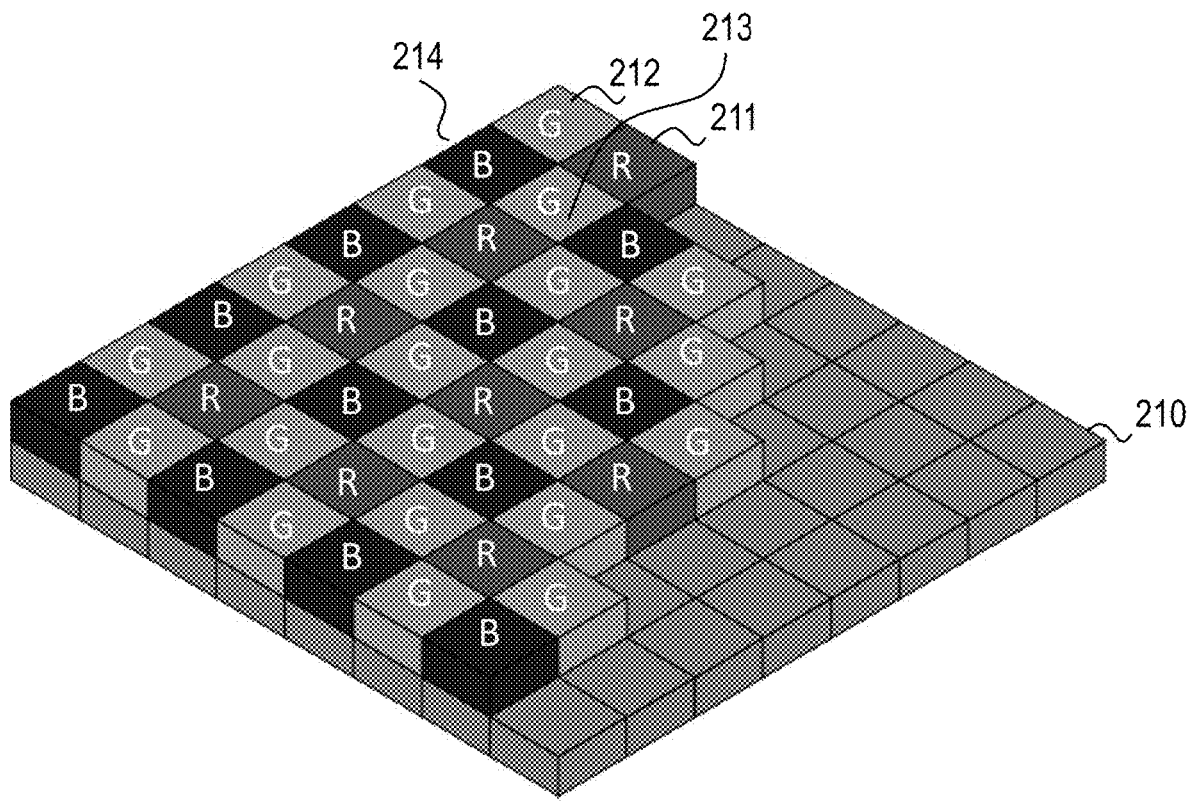
FIG. 2 depicts an example of reducing the data size a color image for use by an autonomous vehicle, in accordance with some example embodiments.
Figure 2:
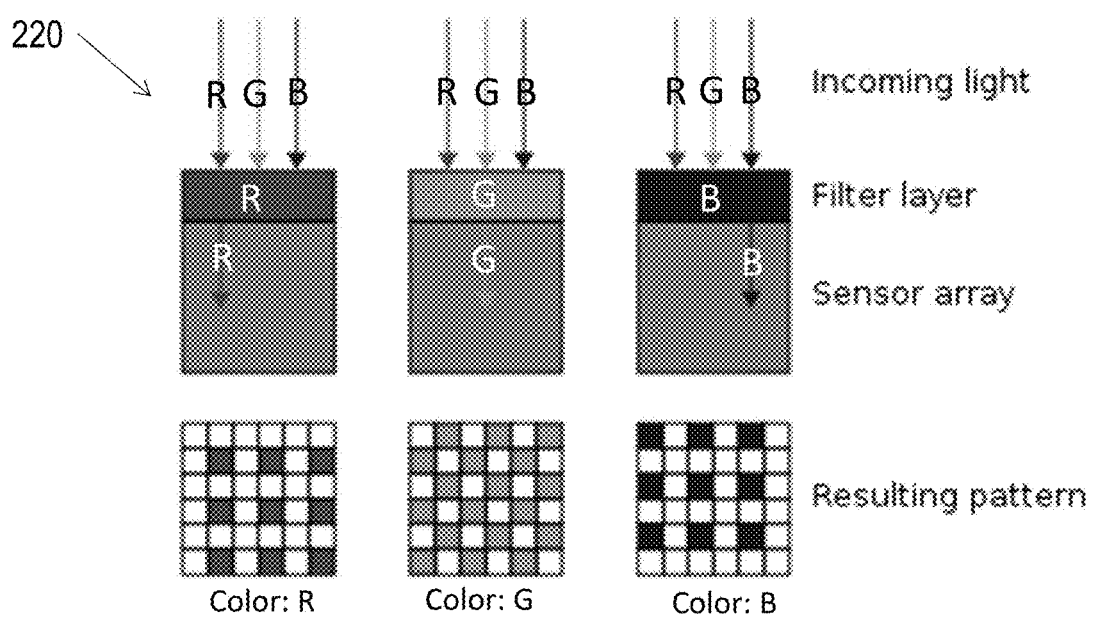

FIG. 2 at 210 depicts an example of a pattern of colors assigned to pixels. Full color images contain three channels—red (R), green (G), and blue (B). FIG. 2 includes labels, "R" for red, "B" for blue, and "G" for green to clearly indicate the colors of the pixels and the colors of light indicated at 220. For every pixel in a typical image, there are three corresponding values. Together, they mix into a real 'color point' we see in the digital image. As described above, instead of three values per pixel, the number of values may be reduced to one by choosing R, G, or B for each pixel. The choice of which pixels are assigned to each may be selected in a pattern. For example, a Bayer pattern image has only one channel but encodes a subset of the information of the three RGB channels in the one channel. For example, a repeating pattern of 2*2 pixel grids may be selected. In some example embodiments, a 'RGGB' Bayer pattern may be used. RGGB refers to red for pixel 211, green for pixel 212, green for pixel 213, and blue for pixel 214 in a repeating 4-pixel square pattern as shown at 210. Different patterns may be selected depending on the hardware. In this way, the three values for pixel 211 corresponding to an R value, a G value, and a B value, the R value is selected and the G and B values are discarded. This same elimination process is applied to each pixel. The pattern may include a greater number of green pixel values than both red and blue. The pattern may be selected such that a value of every other pixel along a row in the reduced image corresponds to a green value of the raw image, or such that a value of every other pixel along a column in the reduced image corresponds to a green value of the raw image. The pattern may include a greater number of green pixel values than both red and blue. In a similar way as described above with respect to more frequent green pixels, red or blue pixels may be more frequent rather than green.

FIG. 2 at 220 shows the selection process from three values to one for an example pixel and the corresponding mosaic of each color selection on an image. The generating the reduced image may be performed using multiple color-selective filters. This may be referred to as a color filter array (CFA).

A Bayer pattern is an example of a color filter array (CFA). In some example embodiments, a color filter array different from a Bayer pattern can be used. Generally, the red, green, and blue colors used in a Bayer pattern can be transformed into another group of three colors where different combinations of the other group of three colors can be combined to cause the appearance of all other visible colors just as red, green, and blue can. Furthermore, a color filter array in some example embodiments may include four instead of three basic colors. For example, a patterned CYGM filter (cyan, yellow, green, magenta) can be used, or a patterned RGBE filter (red, green, blue, emerald) can be used as a CFA. Moreover, in some example embodiments, a CFA may add pixels that are not color filtered including a CMYW (cyan, magenta, yellow, and white) CFA.

Figure 3A:
FIG. 3A depicts examples of Bayer images at different zooms to show the patterns.
Figure 3A:
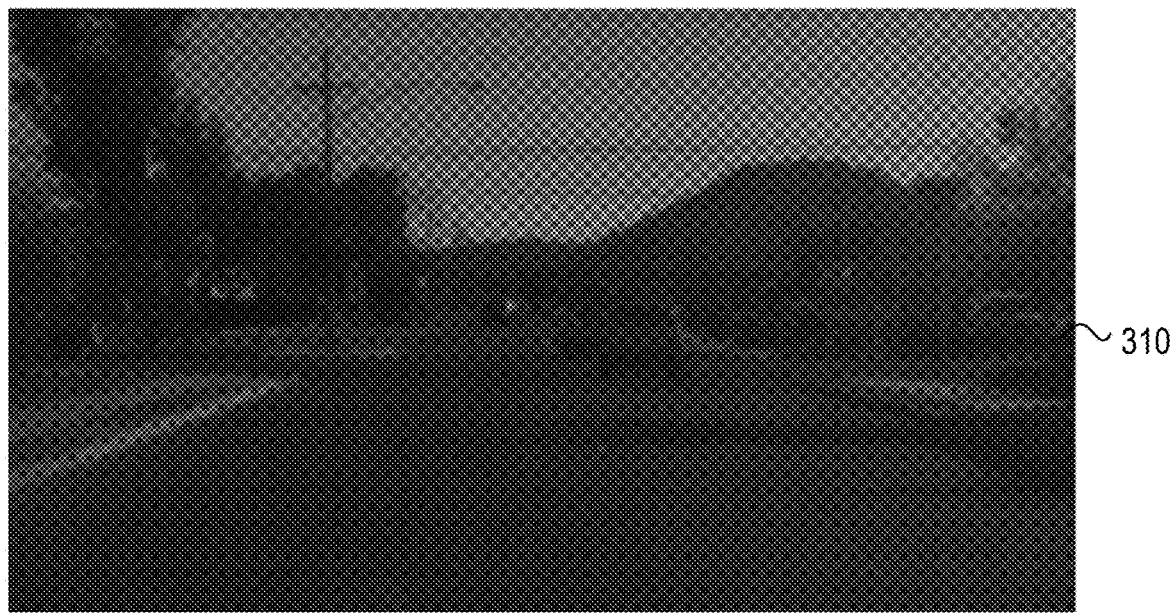
Figure 3B:
FIG. 3B depicts an example of a Bayer pattern image in greyscale.

FIG. 3 at 305 and 310 depict example images with an RGGB Bayer pattern applied to an original full color image. The pattern in the image at 310 is zoomed in to better show the pattern. FIG. 3 at 310 depicts a different image from the image at 305, 320 or in FIG. 4. The image at 305 with RGGB Bayer pattern is the same image as FIG. 3A with the R, G, or B value maintained as one color per pixel. FIG. 3A at 320 depicts a Bayer pattern image with the value for each R, G, and B in the pattern mapped to a black and white gray scale.

Figure 4:
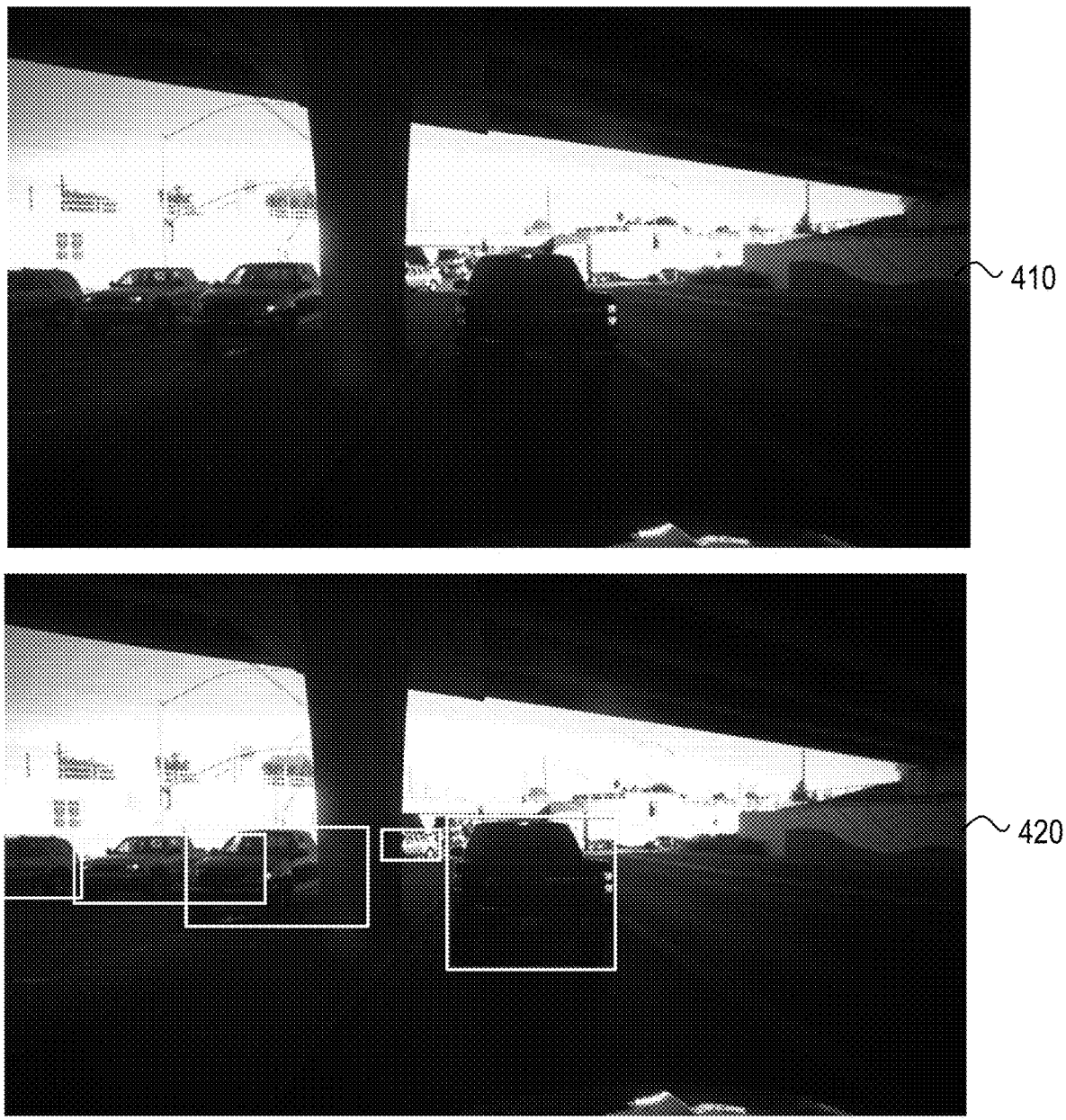
FIG. 4 depicts an example of a contrast image and a perception result, in accordance with some example embodiments.

FIG. 4 at 410 depicts a rendering result after image processing is performed on the image shown at 320. FIG. 4 at 420 depicts a perception result showing object detection on the Bayer pattern image 305.

Some example implementations may be described as following examples.

1. A method for processing an image, comprising: receiving an image including an x-y array of pixels from a sensor array, each pixel in the x-y array of pixels having a value selected from one of three primary colors, based on a corresponding x-y value in a mask pattern; generating a preprocessed image by performing preprocessing on the image; and performing computerized perception on the preprocessed image to determine one or more outlines of physical objects.

2. The method of example 1, wherein the mask pattern is a Bayer pattern.

3. The method of example 2, wherein the Bayer pattern is a red-green-green-blue pattern assigned to a 2-pixel by 2-pixel array repeated across the raw image.

4. The method of example 1, wherein the pattern includes a greater number of green pixel values than both red and blue.

5. The method of example 1, wherein the pattern is selected such that a value of every other pixel along a row in the reduced image corresponds to green value of the raw image.

6. The method of example 1, wherein the pattern is selected such that a value of every other pixel along a column in the reduced image corresponds to green value of the raw image.

6. The method of example 1, wherein, each x-y value in the pattern is from one of three possible values.

7. The method of example 1, wherein the image is generated using one or more color-selective filters.

8. The method of example 1, wherein the preprocessing is performed on the image from the sensor array without human perception image enhancement.

9. The method of example 8, wherein the human perception image enhancement includes one or more of de-mosaicing, white balancing, and noise reduction.

10. The method of example 1, wherein the preprocessing does not include scaling one or more pixels' R, G, or B value for white balancing.

11. The method of example 1, wherein the preprocessing does not include reconstruction a full color image from incomplete color samples output from the sensor array overlaid with a color filter array for de-mosaicing.

12. The method of example 1, wherein the preprocessing does not include noise reduction, wherein noise reduction includes reduction of salt and pepper noise, wherein a noisy pixel bears little relation to the color of surrounding pixels, or reduction of Gaussian noise.

13. The method of example 1, wherein the preprocessing includes image cropping.

14. The method of example 1, wherein the preprocessing includes image resizing.

15. The method of example 1, wherein the preprocessing includes image compression.

16. The method of example 1, wherein the sensor array is a camera.

17. A computer apparatus comprising a processor, a memory and a communication interface, wherein the processor is programmed to implement a method recited in one or more of examples 1 to 16.

18. A computer readable program medium having code stored thereon, the code, when executed by a processor, causing the processor to implement a method recited in one or more of examples 1 to 16.

Figure 5:
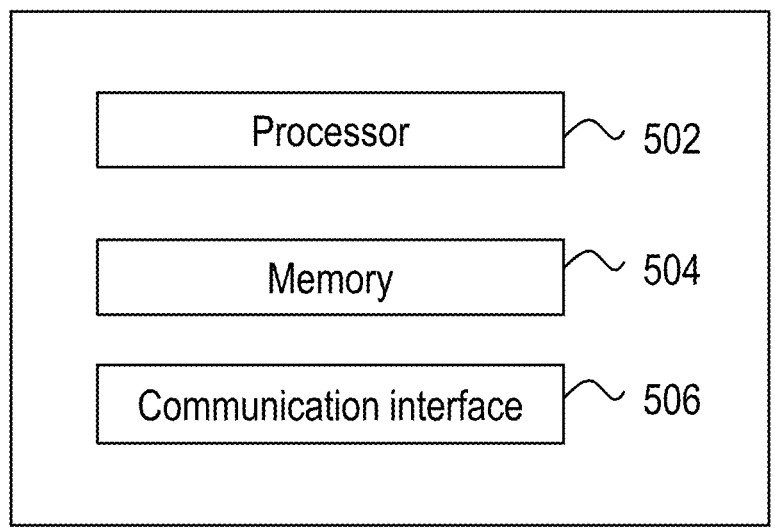
FIG. 5 depicts an example of an apparatus, in accordance with some example embodiments.

FIG. 5 depicts an example of an apparatus 500 that can be used to implement some of the techniques described in the present document. For example, the hardware platform 500 may implement the process 100 or may implement the various modules described herein. The hardware platform 500 may include a processor 502 that can execute code to implement a method. The hardware platform 500 may include a memory 504 that may be used to store processor-executable code and/or store data. The hardware platform 500 may further include a communication interface 506. For example, the communication interface 506 may implement one or more of the communication protocols (LTE, Wi-Fi, and so on) described herein.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An apparatus comprising:
   at least one processor and memory including executable instructions that when executed cause the at least one processor to perform operations comprising:
   receiving an image including an array of pixels from a sensor array, each pixel in the array of pixels having a value corresponding to one of three primary colors selected based on a mask pattern;
   generating a preprocessed image by performing preprocessing on the image, wherein the preprocessing excludes reconstruction of a full color image from incomplete color samples output from the sensor array overlaid with a color filter array for de-mosaicing; and
   performing perception on the preprocessed image.

2. The apparatus of claim 1, wherein the mask pattern is a Bayer pattern.

3. The apparatus of claim 2, wherein the Bayer pattern is a red-green-green-blue pattern assigned to a 2-pixel by 2-pixel array repeated across a raw image.

4. The apparatus of claim 1, wherein the mask pattern includes a greater number of green pixel values than both red and blue.

5. The apparatus of claim 1, wherein the mask pattern is selected such that a value of every other pixel along a row in a reduced image corresponds to a green value of a raw image.

6. The apparatus of claim 1, wherein the mask pattern is selected such that a value of every other pixel along a column in a reduced image corresponds to a green value of a raw image.

7. The apparatus of claim 1, wherein the one of the three primary colors is selected based on a corresponding position value in the mask pattern, and wherein each position value in the mask pattern is from one of three possible values.

8. The apparatus of claim 1, wherein the image is generated using one or more color-selective filters.

9. The apparatus of claim 1, wherein the preprocessing is performed on the image from the sensor array without human perception image enhancement.

10. The apparatus of claim 9, wherein the human perception image enhancement includes one or more of de-mosaicing, white balancing, and noise reduction.

11. The apparatus of claim 1, wherein the preprocessing excludes scaling for white balancing.

12. The apparatus of claim 1, wherein the preprocessing excludes a reduction of salt and pepper noise, or another reduction of Gaussian noise.

13. The apparatus of claim 1, wherein the performing the perception on the preprocessed image determines one or more outlines of objects.

14. A non-transitory computer readable medium having code stored thereon, the code, when executed by a processor, causing the processor to implement a method comprising:
   receiving an image including an array of pixels from a sensor array, each pixel in the array of pixels having a value corresponding to one of three primary colors selected based on a mask pattern;
   generating a preprocessed image by performing preprocessing on the image, wherein the preprocessing excludes reconstruction of a full color image from incomplete color samples output from the sensor array overlaid with a color filter array for de-mosaicing; and
   performing perception on the preprocessed image.

15. The non-transitory computer readable medium of claim 14, wherein the mask pattern is a Bayer pattern, and wherein the Bayer pattern is a red-green-green-blue pattern assigned to a 2-pixel by 2-pixel array repeated across a raw image.

16. The non-transitory computer readable medium of claim 14, wherein the one of the three primary colors is selected based on a corresponding position value in the mask pattern, and wherein each position value in the mask pattern is from one of three possible values.

17. A method for processing an image, comprising:
  receiving an image including an array of pixels from a sensor array, each pixel in the array of pixels having a value corresponding to one of three primary colors selected based on a mask pattern;
  generating a preprocessed image by performing preprocessing on the image, wherein the preprocessing excludes reconstruction of a full color image from incomplete color samples output from the sensor array overlaid with a color filter array for de-mosaicing; and
  performing perception on the preprocessed image.

18. The method of claim 17, wherein the mask pattern is a Bayer pattern.

19. The method of claim 18, wherein the Bayer pattern is a red-green-green-blue pattern assigned to a 2-pixel by 2-pixel array repeated across a raw image.

20. The method of claim 17, wherein the one of the three primary colors is selected based on a corresponding position value in the mask pattern, and wherein each position value in the mask pattern is from one of three possible values.

* * * * *